(12) United States Patent  
Lammer et al.

(10) Patent No.: US 10,837,704 B2  
(45) Date of Patent: Nov. 17, 2020

(54) METHOD FOR REPAIRING A REFRACTORY LINING OF A METALLURGICAL VESSEL IN THE HOT STATE

(71) Applicant: Refractory Intellectual Property GmbH & Co. KG, Vienna (AT)

(72) Inventors: Gregor Lammer, Vienna (AT); Alexander Cepak, Vienna (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 262 days.

(21) Appl. No.: 15/745,168

(22) PCT Filed: May 13, 2016

(86) PCT No.: PCT/EP2016/060889  
§ 371 (c)(1),  
(2) Date: Jan. 16, 2018

(87) PCT Pub. No.: WO2017/012732  
PCT Pub. Date: Jan. 26, 2017

(65) Prior Publication Data  
US 2018/0209739 A1    Jul. 26, 2018

(30) Foreign Application Priority Data  
Jul. 17, 2015    (EP) .................................... 15177235

(51) Int. Cl.  
*F27D 1/16*    (2006.01)  
*F27D 21/00*    (2006.01)  
(Continued)

(52) U.S. Cl.  
CPC ......... *F27D 1/1642* (2013.01); *F27D 1/1636* (2013.01); *F27D 21/0014* (2013.01);  
(Continued)

(58) Field of Classification Search  
CPC ... F27D 1/1642; F27D 1/1636; F27D 21/0014  
See application file for complete search history.

(56) References Cited

U.S. PATENT DOCUMENTS

| 4,218,989 A | 8/1980 | Fujita et al. |
| 4,301,998 A | 11/1981 | Rodway |

(Continued)

FOREIGN PATENT DOCUMENTS

| DE | 10138167 A1 | 2/2003 |
| DE | 10236033 A1 | 2/2004 |

(Continued)

OTHER PUBLICATIONS

Abstract of DE 10138167 A1.  
Abstract of DE 10236033 A1.  
Abstract of JP H06 145742.

*Primary Examiner* — Jacob T Minskey  
*Assistant Examiner* — Melody Tsui  
(74) *Attorney, Agent, or Firm* — Brian Roffe

(57) ABSTRACT

A method for repairing a refractory lining of a metallurgical vessel in the hot state. This repair takes place using a supplying apparatus. In addition, recording of at least the worn regions and monitoring of the repair are carried out by a monitoring device. Before, during and/or after the supplying of material, at least a partial region of the areas of the refractory lining of the vessel or the gunning jet is recorded photographically with visualization of the temperature ranges. This results in an evaluation with regard to different parameters such as properties, layer thickness and/or distribution of the supplied material. It has been demonstrated that visualization of the temperature ranges of the areas to be repaired and of the refractory material during supplying of material enables different parameters to be established very accurately, and as a result, optimal coating of the wall lining can be achieved.

20 Claims, 1 Drawing Sheet

(51) Int. Cl.
  *F27D 21/02*  (2006.01)
  *G01J 5/00*  (2006.01)
  *G01J 5/50*  (2006.01)
  *G01J 5/60*  (2006.01)

(52) U.S. Cl.
  CPC .... *F27D 21/0021* (2013.01); *F27D 2001/161* (2013.01); *F27D 2001/1605* (2013.01); *F27D 2021/026* (2013.01); *G01J 5/0044* (2013.01); *G01J 5/505* (2013.01); *G01J 5/605* (2013.01)

(56) References Cited

U.S. PATENT DOCUMENTS

| | | |
|---|---|---|
| 5,158,366 A | 10/1992 | Nagai et al. |
| 6,780,351 B2 | 8/2004 | Wirth, Jr. |

FOREIGN PATENT DOCUMENTS

| | | | |
|---|---|---|---|
| EP | 0039212 A1 | 11/1981 | |
| EP | 0039212 B1 * | 4/1985 | ......... F27D 21/0021 |
| EP | 1473350 A1 | 11/2004 | |
| WO | 2003081157 A1 | 10/2003 | |
| WO | 2017012732 A1 | 1/2017 | |

* cited by examiner

METHOD FOR REPAIRING A REFRACTORY LINING OF A METALLURGICAL VESSEL IN THE HOT STATE

FIELD OF THE INVENTION

The invention relates to a method, in particular for repairing a refractory lining of a metallurgical vessel in the hot state, wherein this repair takes place by means of a supplying apparatus and at least the worn regions are recorded and a monitoring of the repair takes place by means of a monitoring device, and to a corresponding device for implementing the method.

BACKGROUND OF THE INVENTION

According to publication EP-A-0 039 212 a remote-controlled injection apparatus for repairing a refractory lining of a metallurgical vessel at increased temperature is disclosed. This apparatus has a rotatable, vertical line that has a nozzle on its lower end. The supply of a fluidized flow of particulate refractory material is delivered, pressurized, to the line. Aligning means are used to align the line and the nozzle horizontally and vertically within the vessel close to a region of the lining to be repaired.

A television camera is attached to the line close to the nozzle in order to observe the inside of the vessel so as to locate the aforementioned region and to monitor the repair. This camera is disposed within a housing which is equipped with a transparent, heat-resistant opening in the line of sight of the lens. Moreover, a cooling device is attached to this housing in order to keep the camera cool, and temperature sensors are attached to a connection to the outside. With the aid of this camera the areas to be repaired can be visualized by a user, and so it is made possible for him to operate the gunning lance from outside of the hot vessel.

Another system for repairing and monitoring a refractory lining is described in publication U.S. Pat. No. 6,780,351 wherein a laser is guided into a hot furnace or a vessel and laser beams are reflected therein in order to achieve a three-dimensional measurement of the inside of the furnace or vessel as an actual value. These actual values are then compared with reference values, and consequently a gunning lance is guided in a controlled manner in order to inject refractory material taking into account a number of physical variables in relation to the vessel.

OBJECTS AND SUMMARY OF THE INVENTION

In contrast, the underlying object of the present invention is to devise a method by means of which a refractory lining of a vessel receiving molten metal can be repaired with improved precision and quality.

According to the invention, this object is achieved by, before, during and/or after the supplying of the material, at least a partial region of the worn areas of the refractory lining of the vessel to be repaired or the gunning jet is recorded photographically with visualization of the temperature ranges, and this results in an evaluation with regard to different parameters such as properties, layer thickness and/or distribution of the supplied material, and a device that includes at least one imaging unit, preferably a thermal imaging camera, by means of which pictures with visualization of the temperature ranges are produced.

The method according to the invention makes provision such that before, during and/or after the supplying of the material, at least a partial region of the refractory lining of the vessel to be repaired or the gunning jet is recorded photographically with visualization of the temperature ranges, and this results in an evaluation with regard to different parameters, such as properties, layer thickness and/or distribution of the supplied material.

It has been demonstrated that by means of this visualization of the temperature ranges of the areas to be repaired and of the refractory material during supplying of the material, different parameters can be established very accurately during supplying, and as a result optimal coating of the wall lining can be achieved.

Very advantageously, the device comprises at least one imaging unit, preferably a thermal imaging camera, by means of which pictures with visualization of the temperature ranges is recorded from outside of the vessel.

This recording of the current state of the supplying of the refractory material to the areas in the wall lining of the vessel to be repaired makes it possible, following a comparison with target specifications from stored pictures, to immediately change the actuation of this supplying apparatus and/or to adapt the pre-programmed control to subsequent treatments.

Other advantageous details of this method within the framework of the invention are defined in the dependent claims.

BRIEF DESCRIPTION OF THE DRAWINGS

An exemplary embodiment of the invention is described in more detail below by means of drawings. These show as follows.

DETAILED DESCRIPTION OF THE INVENTION

Figure 1:
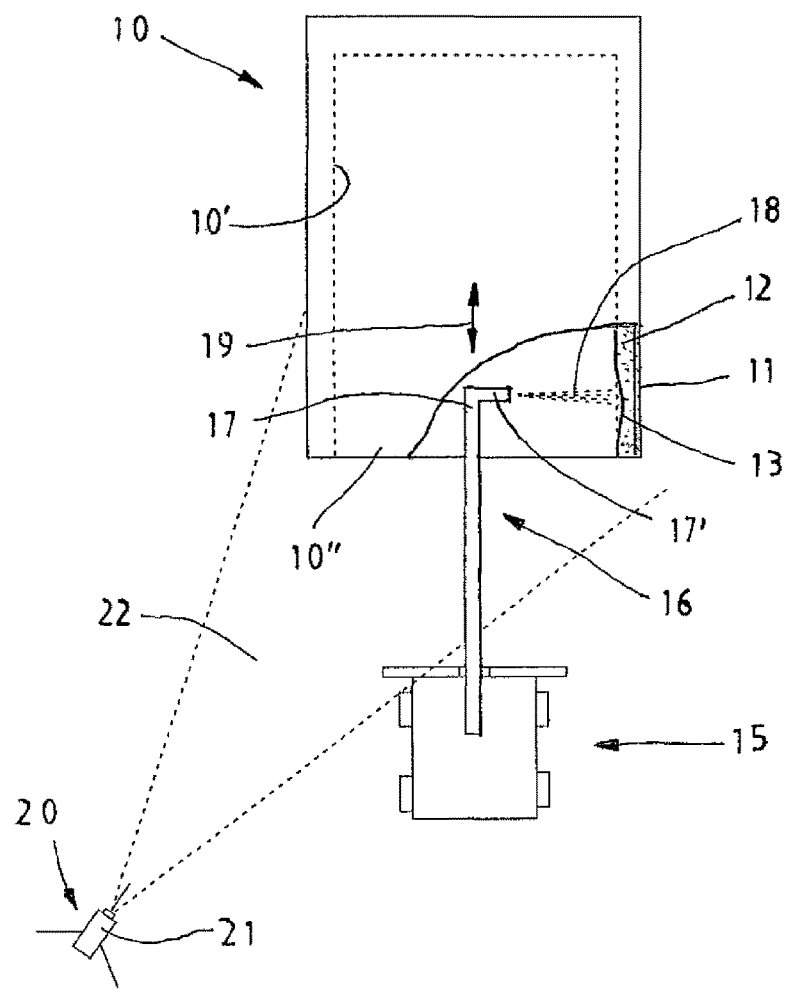
FIG. 1 is a diagrammatic illustration of a device with a thermal imaging camera and of a metallurgical vessel shown partially in section, for implementing the method according to the invention.

FIG. 1 shows diagrammatically a metallurgical vessel 10 with a steel jacket 11 and a refractory lining 12 consisting of a wall lining with refractory bricks and optionally additionally of gunning on layers. The metallurgical vessel 10 can be, for example, a ladle containing molten metal or a tundish in continuous casting plants or also converters or electric furnaces.

With these metallurgical vessels 10 it is normal and necessary to carry out a repair of the refractory lining 12 at the worn areas 13 or also on the entire inner wall 10' after a specific operating time by means of an supplying apparatus 15 known in its own right as a manipulator or as a robot, this taking place in the hot state of the respective vessel so that this material to be supplied dries within a reasonable period of time and in so doing connects sufficiently to the existing wall lining.

This supplying apparatus 15 has a gunning lance 16 with at least one injection head 17, by means of which preferably fluidized refractory material is supplied by a gunning jet 18 that has been generated. The angular gunning lance 16 with a transversely disposed outlet nozzle 17' is on the one hand rotated by the adjustable supplying apparatus 15 during supplying and additionally moves as required in the axial direction so that the vessel 10 can also be provided with gunning material in the height direction 19.

According to the invention, before, during and/or after supplying of the material, at least a partial region of the areas 13 of the refractory lining 12 of the vessel 10 to be repaired or the gunning jet 18 is recorded photographically with visualization of the temperature ranges, and this can result in an evaluation with regard to different parameters, in particular with regard to the properties, layer thickness and/or the distribution of the supplied material.

Advantageously, for this purpose a device 20 with at least one imaging unit, preferably a thermal imaging camera 21, is used that is positioned outside of the vessel 10 and by means of which, preferably during supplying of the material, it is recorded by taking a number of photographic pictures 25 with visualization of the temperature ranges 26, 27, 28. One such picture 25 is illustrated in FIG. 2.

This device 20 is positioned sufficiently far away from the vessel 10, outside of its center axis and to the side of the supplying apparatus 15, so that the thermal imaging camera 21 forms a conical receptacle 22 that records this partial region with approximately the opening 10" of the vessel 10 and additionally the gunning jet 18 with the surface 18' in the lining 12 upon which the gunning jet 18 acts.

In addition, this device 20 is protected from the heat radiation from the vessel by protective shields or similar (not detailed) so that the camera does not exceed the specified heating temperatures.

Figure 2:
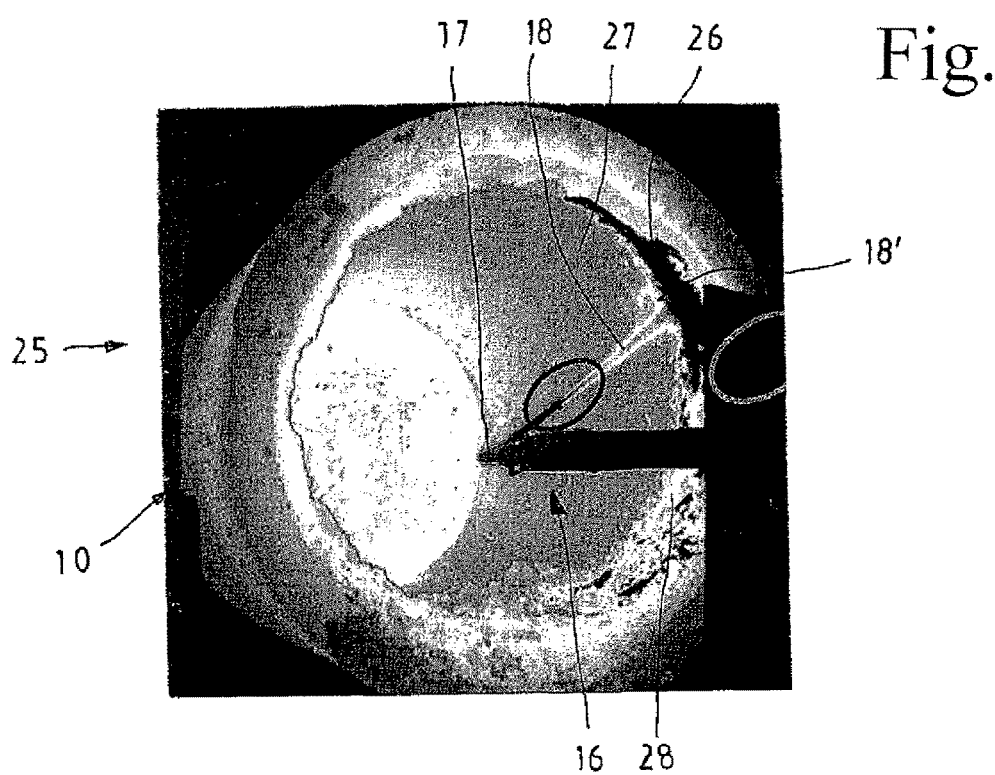
FIG. 2 is a photographic picture produced by means of a thermal imaging camera according to FIG. 1 primarily of the inside of the vessel and of a gunning lance with the gunning jet during injection of refractory material.

According to this picture 25 shown in FIG. 2, corresponding colors are allocated to these specific temperatures of a respective temperature range 26, 27, 28. Depending on the use of the type of heat or thermal imaging camera 21, different colors can be provided for the same temperatures.

These pictures 25 of the imaging unit can be taken in real time during supplying of the refractory material here and parameters which are recorded and which are immediately evaluated are compared with target specifications of pictures in the supplying apparatus and the supplying apparatus is correspondingly actuated.

Needless to say, within the framework of the invention one or a number of photographic pictures 25 can also be produced only before and/or after supplying. Occasionally, this is dependent upon the extent of the areas 13 to be repaired. With a relatively small repair one picture 25 before and after supplying may suffice. With a picture after supplying one can additionally establish whether the gunned on material has become detached again due to poor adhesion.

Cameras which work with infrared radiation and which record a temperature range between approximately ambient temperature and advantageously at least approximately 1,500° C. are especially suitable as thermal imaging cameras 21. Suitable as examples are thermal imaging cameras made by FLIR, T600 series or by InfraTec of the VarioCAM type range with a maximum definition of over 500 pixels which are available on the market.

Furthermore, with these images according to the invention different parameters of the gunning jet can be evaluated, occasionally the delivery pressure, the loading, the gunning angle of the jet, the distance between the gunning lance and the inside of the vessel and/or the geometry of the nozzle outlet of the gunning lance. The temperature of the refractory material upon passing out of the gunning head generally corresponds approximately to ambient temperature. However, depending on the requirements a higher temperature can be provided, for example for the purpose of tempering the supplied material.

In addition, the pictures of the imaging unit can be stored and be evaluated by calculations by means of a software programme and analyses resulting from the latter, and so the control of the lance for the current and also the subsequent repair inserts can be changed and so improved.

Another advantage within the framework of the invention is that the wall thicknesses of the refractory lining before and after supplying can be calculated from the pictures and the determined temperature ranges.

The invention is sufficiently displayed by the above exemplary embodiment. However, in principle more than one thermal imaging camera could also be provided. Not all possible evaluations from these pictures are described either. With sufficient heat insulation this type of camera could also be disposed within the vessel, preferably in the gunning head, and is positioned here, however, such that the gunning jet is recorded.

This photographic visualization of the temperature regions could also take place by means of video recordings.

The repair could also basically take place at outlet openings on the vessels.

The invention claimed is:

1. A method for repairing a refractory lining of a metallurgical vessel in a hot state, comprising:
    supplying material to the refractory lining to repair the refractory lining by means of a supplying apparatus,
    positioning an imaging device entirely outside of an interior space of the vessel, and
    photographically recording, using the imaging device when positioned entirely outside of the interior space of the vessel, at least a partial region of areas of the refractory lining of the vessel being repaired or a gunning jet of the material formed during supplying of the material to the refractory lining by the supplying apparatus to obtain at least one picture including visualization of temperature ranges.

2. The method according to claim 1, wherein the imaging device comprises at least one imaging unit, a plurality of photographic pictures including visualization of temperature ranges being photographically recorded using the at least one imaging unit.

3. The method according to claim 1, wherein the at least one imaging unit comprises a thermal imaging camera.

4. The method according to claim 1, further comprising:
    storing the at least one picture obtained by the imaging device; and
    evaluating the at least one picture obtained by the imaging device by means of a software program.

5. The method according claim 1, wherein the at least one picture comprises a plurality of pictures and the pictures are taken in real time during supplying of the material, further comprising:
    comparing parameters for the supplying of the material with the supplying apparatus with target specifications of stored pictures; and
    actuating the supplying apparatus immediately during supplying of the material based on the comparing of the parameters for the supplying of the material.

6. The method according to claim 1, wherein the supplying apparatus includes an injection apparatus having at least one gunning lance from which the gunning jet of material is supplied to the refractory lining, the method further comprising:
    identifying at least one parameter of the gunning jet or the gunning lance on the basis of the at least one picture obtained by the imaging device.

7. The method according to claim 1, wherein the at least one picture comprises a plurality of pictures at least one of which is obtained before supplying material to the refractory lining and at least one of which is obtained after supplying material to the refractory lining, the method further comprising calculating wall thicknesses of the refractory lining before and after supplying material to the refractory lining from the pictures obtained by the imaging device before and after supplying material to the refractory lining and the temperature ranges.

8. The method according to claim 1, wherein the step of photographically recording, using the imaging device positioned entirely outside of the vessel, at least the partial region of the areas of the refractory lining of the vessel being repaired or the gunning jet of the material formed during supplying of the material to the refractory lining to obtain at least one picture including visualization of temperature ranges comprises:
photographically recording, using the imaging device positioned entirely outside of the vessel, at least the partial region of areas of the refractory lining of the vessel being repaired before the material is supplied to the refractory lining.

9. The method according to claim 1, wherein the step of photographically recording, using the imaging device positioned entirely outside of the vessel, at least the partial region of the areas of the refractory lining of the vessel being repaired or the gunning jet of the material formed during supplying of the material to the refractory lining to obtain at least one picture including visualization of temperature ranges comprises:
photographically recording, using the imaging device positioned entirely outside of the vessel, at least the partial region of areas of the refractory lining of the vessel being repaired while supplying the material to the refractory lining.

10. The method according to claim 1, wherein the step of photographically recording, using the imaging device positioned entirely outside of the vessel, at least the partial region of the areas of the refractory lining of the vessel being repaired or the gunning jet of the material formed during supplying of the material to the refractory lining to obtain at least one picture including visualization of temperature ranges comprises:
photographically recording, using the imaging device positioned entirely outside of the vessel, at least the partial region of areas of the refractory lining of the vessel being repaired after the material is supplied to the refractory lining.

11. The method according to claim 1, wherein the step of photographically recording, using the imaging device positioned entirely outside of the vessel, at least the partial region of the areas of the refractory lining of the vessel being repaired or the gunning jet of the material formed during supplying of the material to the refractory lining to obtain at least one picture including visualization of temperature ranges comprises:
photographically recording, using the imaging device positioned entirely outside of the vessel, the gunning jet of the material formed during supplying of the material to the refractory lining while supplying the material to the refractory lining.

12. The method of claim 1, further comprising evaluating the at least one picture to obtain information about properties of the material being supplied to the supplying apparatus, thickness of a layer of the material being applied to the refractory lining or distribution of the material on the refractory lining.

13. The method according claim 1, wherein the at least one picture comprises a plurality of pictures and the pictures are taken in real time during supplying of the material, further comprising:
comparing parameters for the supplying of the material with the supplying apparatus with target specifications of stored pictures; and
adapting pre-programmed control of the supplying apparatus based on the comparing of the parameters for the supplying of the material.

14. The method according to claim 1, wherein the at least one picture comprises a plurality of pictures at least one of which is obtained before supplying material to the refractory lining and at least one of which is obtained after supplying material to the refractory lining and the visualization of the temperature ranges comprises determining the temperature ranges, further comprising calculating wall thicknesses of the refractory lining before and after supplying material to the refractory lining from the pictures obtained by the imaging device before and after supplying material to the refractory lining and the determined temperature ranges.

15. The method according claim 1, wherein the at least one picture comprises a plurality of pictures and the pictures are taken in real time during supplying of the refractory material.

16. The method according to claim 3, wherein the step of positioning the imaging device entirely outside of the interior space of the vessel comprises positioning the thermal imaging camera at a distance from the vessel and to a side of the supplying apparatus such that the thermal imaging camera forms a conical receptacle that results in the partial region of the areas to be repaired, an opening of the vessel and the gunning jet with a surface upon which the gunning jet acts being included in the at least one picture.

17. The method according to claim 3, wherein the step of photographically recording at least the partial region of the areas of the refractory lining of the vessel being repaired or the gunning jet of the material formed during supplying of the material to the refractory lining by the supplying apparatus to obtain the at least one picture including visualization of temperature ranges comprises visualizing, using the thermal imaging camera, the temperatures ranges with different colors based on infrared radiation such that each temperature range is associated with one of the different colors.

18. The method according to claim 1, wherein the step of positioning the imaging device entirely outside of the interior space of the vessel comprises positioning the imaging device separate and apart from the supplying apparatus.

19. The method of claim 1, wherein the supplying apparatus includes an injection apparatus having at least one gunning lance from which the gunning jet of material is supplied to the refractory lining, the method further comprising:
determining at least one parameter of the gunning jet or the gunning lance on the basis of the at least one picture obtained by the imaging device.

20. The method of claim 6, wherein the at least one picture comprises a plurality of pictures and the step of identifying at least one parameter of the gunning jet or the gunning lance on the basis of the pictures obtained by the imaging device comprises identifying one or more of the following different parameters:
delivery pressure of the gunning jet;
loading of the gunning jet;

gunning angle of the gunning jet;
distance between the gunning lance and an interior surface of the vessel; and
geometry of a nozzle outlet of the gunning lance.

* * * * *